United States Patent [19]
Toller et al.

[11] Patent Number: 6,127,649
[45] Date of Patent: Oct. 3, 2000

[54] PROCESS CHAMBER FOR LASER PEENING

[75] Inventors: Steven M. Toller, Grove City; Jeffrey L. Dulaney, Dublin; Allan H. Clauer, Worthington; Mark E. O'Loughlin, Galloway, all of Ohio

[73] Assignee: LSP Technologies, Inc., Dublin, Ohio

[21] Appl. No.: 09/457,033

[22] Filed: Dec. 8, 1999

Related U.S. Application Data

[63] Continuation of application No. 09/000,777, Dec. 30, 1997, Pat. No. 6,064,035.

[51] Int. Cl.[7] .............................. B23K 26/00; B23K 26/16
[52] U.S. Cl. .................................. 219/121.86; 219/121.84
[58] Field of Search .......................... 219/121.84, 121.86, 219/121.85; 427/554, 556, 596; 148/525, 565

[56] References Cited

U.S. PATENT DOCUMENTS

| | | | |
|---|---|---|---|
| 3,866,398 | 2/1975 | Vernon, Jr. et al. | 219/121.84 |
| 4,149,062 | 4/1979 | Limmer et al. | 219/121.84 |
| 4,434,349 | 2/1984 | Tsutsumi | 219/121.84 |
| 4,987,286 | 1/1991 | Allen | 219/121.84 |
| 5,571,575 | 11/1996 | Takayanagi | 427/596 |
| 5,643,477 | 7/1997 | Gullo et al. | 219/121.86 |
| 5,741,559 | 4/1998 | Dulaney | 429/556 |
| 6,064,035 | 5/2000 | Toller et al. | 219/121.86 |

*Primary Examiner*—Geoffrey S. Evans
*Attorney, Agent, or Firm*—Randall J. Knuth

[57] ABSTRACT

An apparatus creating a processing cell for laser peening operations includes an enclosure which substantially defines a work cell or processing cell with a transparent overlay material applicator disposed therein. A cleaning system is utilized that may include a vapor exhaust, liquid removal system, and a gas or air supply. A vapor exhaust system is connected to the enclosure for removing vapor from within the processing cell. A liquid removal system is connected to the enclosure for removing liquid from the processing cell. A gas or air supply is connected to the enclosure to flood the enclosure with gas or air to flush airborne debris therefrom. A workpiece manipulator may be disposed or operate within the cell for moving workpieces therein.

17 Claims, 3 Drawing Sheets

PROCESS CHAMBER FOR LASER PEENING

CROSS-REFERENCE TO RELATED APPLICATIONS

This application is a continuation of U.S. application Ser. No. 09/000,777, filed Dec. 30, 1997, now U.S. Pat. No. 6,064,035, entitled PROCESS CHAMBER FOR LASER PEENING by the same inventors as the instant application and assigned to the same assignee as the instant application.

BACKGROUND OF THE INVENTION

1. Field of the invention.

The present invention relates to the use of coherent energy pulses, as from high power pulsed lasers, in the laser peening or shock processing of solid materials, and, more particularly, to an apparatus for containing the laser peening operation. A processing cell for laser peening is thus constructed that acts as a laser peening workstation.

2. Description of the related art.

Known methods for shock processing of solid materials, particularly laser shock processing solid materials, typically use coherent energy as from a laser beam oriented perpendicular to a workpiece.

Laser shock processing techniques and equipment can be found in the U.S. Pat. No. 5,131,957 to Epstein using transparent overlay materials and opaque overlay materials on a workpiece.

It has been found through experience with laser shock processing systems, that problems occur as the process speed is increased. Of particular importance is that of protecting the optics of the laser peening system, particularly those of the lenses and mirrors, from the effects of the laser peening process itself. Such problem effects include the high velocity ejection of transparent overlay material, opaque overlay material, vaporized particles, and other debris from the laser peening area on the workpiece. Other operational problems become evident, such as debris from previous laser peening operations remaining airborne or within the laser beam path of a subsequent laser peening operation. Such subsequent laser peening operation is thereby degraded because of such debris within the beam path. Additional effects of increased exposure to the by-products of the laser peening process on operators and observers is noted as process speed increases.

A prior system to increase the protection of the laser peening, system optics was to move such optics away from the laser peening area, thus using distance to solve the problem. This necessitates creating optics with a long focal length so that there is sufficient distance between the laser peening operation and the optics in the laser peening system.

What is needed in the art is a compact apparatus to reduce floor space requirements of the laser peening system, protect the laser beam delivery optics, and ensure a cleaner laser beam path to the workpiece.

SUMMARY OF THE INVENTION

The present invention provides an apparatus of a processing cell for laser peening operations. This cell comprises an enclosure which substantially defines a work cell or processing cell with a transparent overlay material applicator disposed therein. A cleaning system is utilized that may include one or more of the following systems: a vapor exhaust, liquid removal, and a gas or air supply. A vapor exhaust system is connected to the enclosure for removing vapor from within the processing cell. A liquid removal system is connected to the enclosure for removing liquid from the processing cell. A gas or air supply is connected to the enclosure to flood the enclosure with gas or air to flush airborne debris therefrom. A workpiece manipulator may be disposed or operate within the cell for moving workpieces therein.

The invention, in another form thereof, comprises a processing cell with an enclosure which substantially defines the laser peening process cell. The enclosure includes a port for entry of a laser beam. An air knife is operationally oriented with the port to inhibit debris and other matter from passing through or on to the port.

An advantage of the present invention is that the enclosure of the processing cell protects the laser beam optics associated with the laser peening system. Such enclosure further protects the laser beam delivery system, along with containing the byproducts of laser shock peening.

Another advantage of the present invention is that the processing cell has reduced floor space requirements.

Yet another advantage of the present invention is that the processing cell utilizes laser optics that may be located closer to the laser shock workpiece than previously utilized. By locating such optics closer to the workpiece increased stability, and increased laser spot control is created.

An additional advantage of the present invention is that by substantially containing the laser shock processing environment, operator safety is increased.

Yet another advantage of the present invention is that by use of a cleaning system, the beam pathway to the workpiece from the beam delivery system is kept cleaner, thereby increasing the laser power actually applied to the workpiece.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
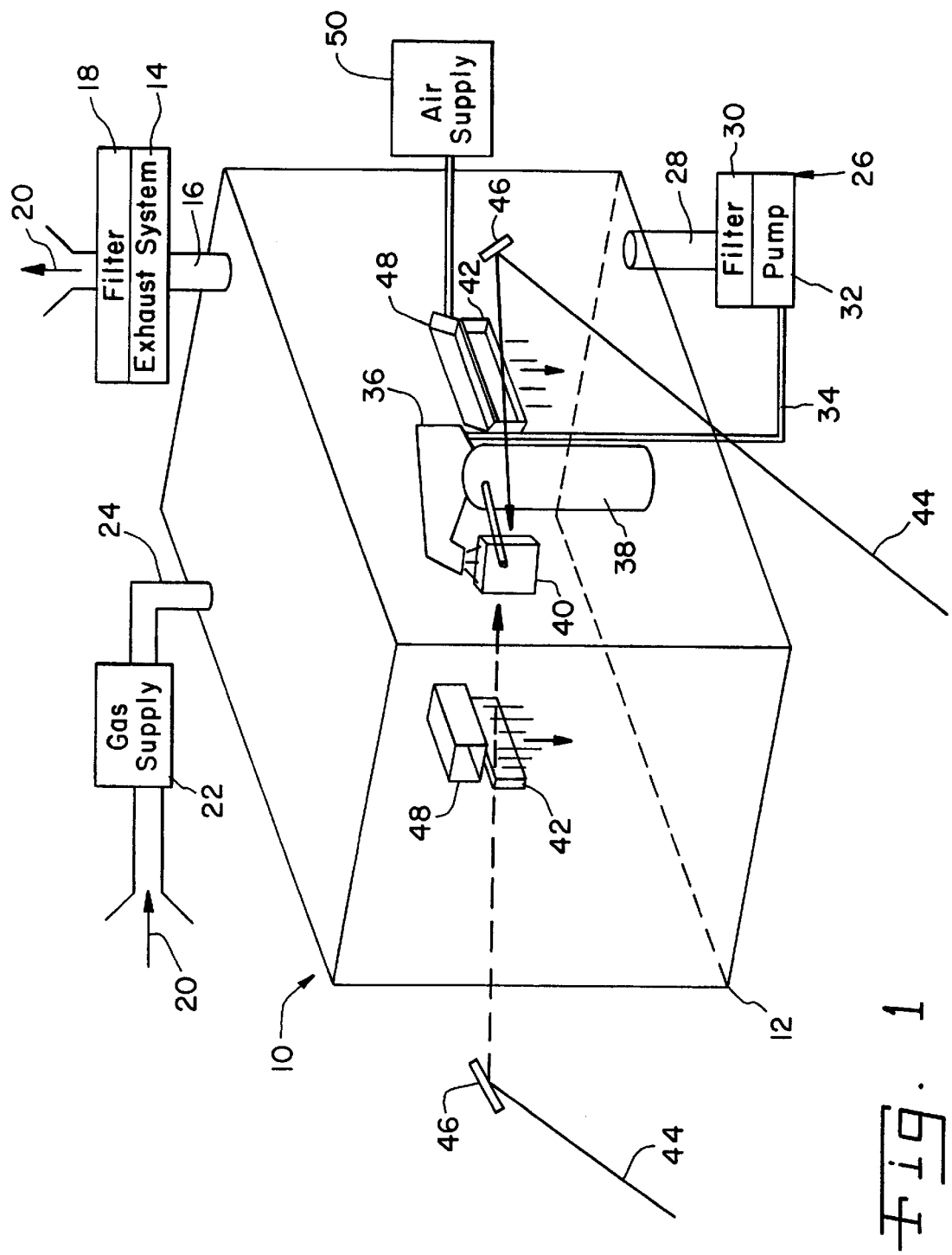
FIG. 1 is a perspective, diagrammatic view of the laser peening processing cell of the present invention.

Referring now to the drawings, particularly to FIG. 1, there is shown components of one embodiment of the process chamber or processing cell 10 of the present invention. Cell 10 includes an enclosure 12, the enclosure 12 substantially defining the processing cell for laser peening operations.

Enclosure 12 may be made from a number of materials such as opaque Lexan, plexiglass, aluminum, or steel that are impervious to the reactants and products of the laser peening operation. Additionally, such enclosure 12 may be made of laser safe glass or plastic to permit an operator a view of activity within enclosure 12. Enclosure 12 may be free standing, or alternatively may comprise a room or portion of a building.

Processing cell 10 includes a cleaning system for cleaning the environment enclosed by enclosure 12. The cleaning system includes the use of a vapor exhaust system 14, which is in communication with the interior of enclosure 12 by means of a conduit 16. Associated with vapor exhaust system 14 may be various types of filters 18 for filtering the environment (loaded with water vapor and vaporized particles during laser peening) within processing cell 10 prior to ejection into the ambient atmosphere as shown by arrow 20. Vapor exhaust system 14 in a preferred embodiment includes a fan or pump for moving vapor and air located within enclosure 12 through to the ambient area 20 outside and away from processing cell 10.

The cleaning system of the present invention may also include the use of a gas supply 22, in communication with the interior of enclosure 12 by means of a conduit 24. Gas supply 22 may supply either compressed gas or air, or simply provided a mechanism for moving in gasses from an ambient atmosphere 20 to the interior of enclosure 12. In the preferred case, a simple fan or blower mechanism may be utilized, along with a filter and/or air conditioner to supply fresh filtered air into enclosure 12.

The cleaning system of the invention may also include the use of a liquid removal system 26 for removing liquids and other debris generated within enclosure 12 during the laser peening operation. Liquid removal system 26 may include the use of a conduit or drain 28 to collect liquid and other laser peening byproducts from enclosure 12. The liquid removal system 26 also includes a filter mechanism 30 for filtering the debris and laser peening byproducts from the liquid collected within enclosure 12. Such filter may be a one-micron particle filter.

Additionally, the liquid removal system may include the use of a pump 32 to pump the previously filtered liquid via a conduit 24 to a transparent overlay material applicator 36. In this fashion as shown in FIG. 1, the liquid removal system 26 acts as a closed loop feedback system collecting liquid, such as transparent overlay material for reuse. In other embodiments of the invention, the process cell 10 may be constructed not to use a closed feedback loop for transparent overlay material recovery. Such construction may increase the number of process variables during the laser peening operation.

As shown in FIG. 1, a workpiece manipulator, such as a workpiece holder or robotic arm 38, is shown holding a workpiece 40. Although shown in FIG. 1 as operating entirely within the enclosure 12, the manipulator or robot 38 may operate totally within enclosure 12, partially within, or operate from the exterior processing cell 10, as shown in FIG. 3.

Figure 2:
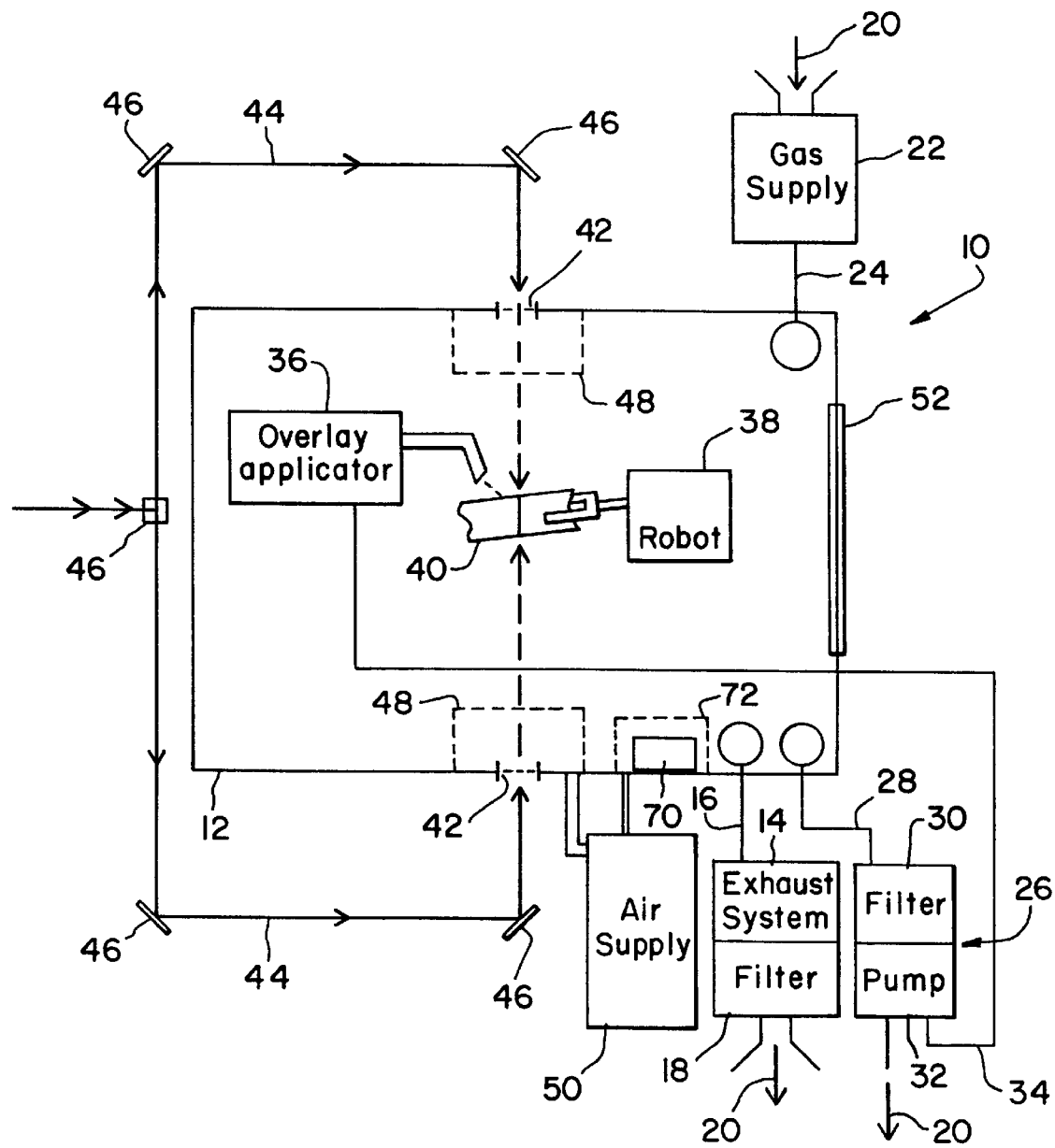
FIG. 2 is a diagrammatic top view of the laser peening processing cell of the present invention.

Enclosure 12 further includes at least one port 42 that permits application of a laser beam 44 through the wall of enclosure 12 and into contact with workpiece 40. As shown in FIGS. 1 and 2, various optics of the beam delivery system, such as mirrors 46, are shown for directing beam 44 to a pre-defined location on workpiece 40.

Connected to enclosure 12 is a mechanism to prevent transparent overlay material, debris, and other items located within enclosure 12 from depositing on, or escaping via ports 42 into the ambient environment, or environment outside of enclosure 12. As shown in FIGS. 1 and 2, air knives 48 are operationally attached about ports 42. Such air knives are operated via a source of compressed air, such as from an air supply 50, as shown in FIG. 2. Air knives 48 are constructed to flow a supply of air from air supply 50 past and over ports 42 thereby preventing transparent overlay material and other items (ejected during laser peening operation) from depositing on or passing through port 42 and into contact with items outside of enclosure 12, such as beam delivery system, represented by mirrors 46. The preferred type of air knife use is that of a Model 2006 air knife supplied by Exair company located in Cincinnati, Ohio. By adjusting air pressure and/or orifice size, it is possible to protect the optics. FIG. 2 shows the processing cell 10 with a door 52 that may be open and closed for permitting workpieces 40 into and out of enclosure 12.

Figure 3:
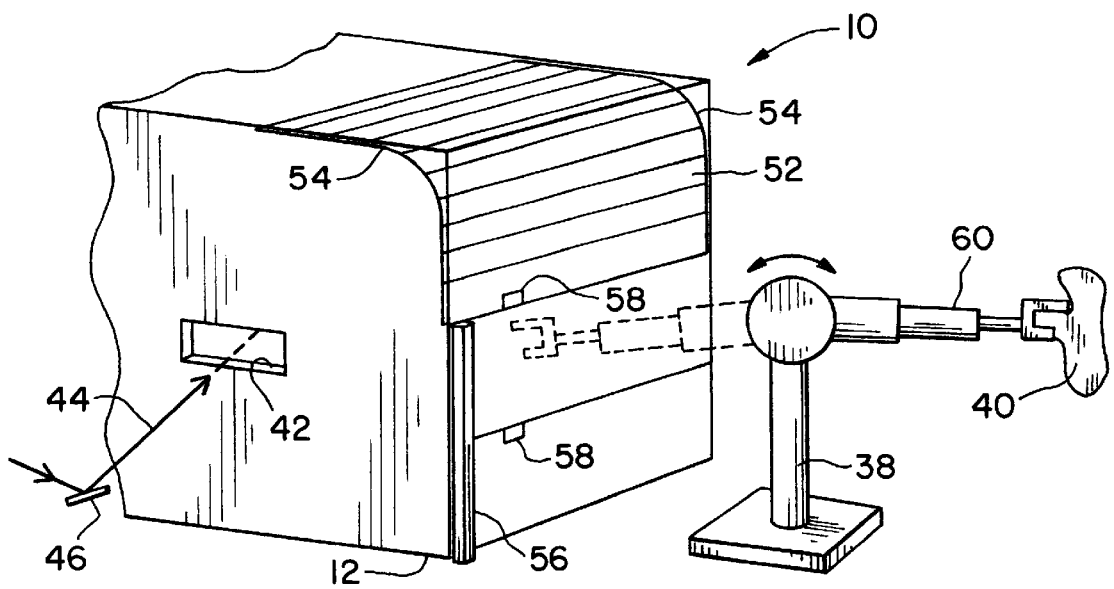
FIG. 3 is a perspective exaggerated diagrammatic view of the present invention shown with the workpiece manipulating robot located outside of the processing cell.

FIG. 3 shows an embodiment of door 52, that of being a roll-type door located along tracks 54. A hydraulic closure mechanism 56 is used for automatically opening and closing door 52 based upon a signal from a controller or operator. Of course, other door actuating mechanisms may be equivalently utilized, such as gear, chain, and pneumatic type door operators. Door 52 may include the use of a limit type switch 58 operative to send a signal to ensure that door 52 is closed prior to commencing laser peening operation.

In the embodiment shown in FIG. 3, the workpiece manipulator device or robot 38 is shown disposed outside of enclosure 12. In this case, the robot 38 may include an extendable arm 60, which may pivot toward and away from enclosure 12 for passing a workpiece 40 into enclosure 12.

Figure 4:
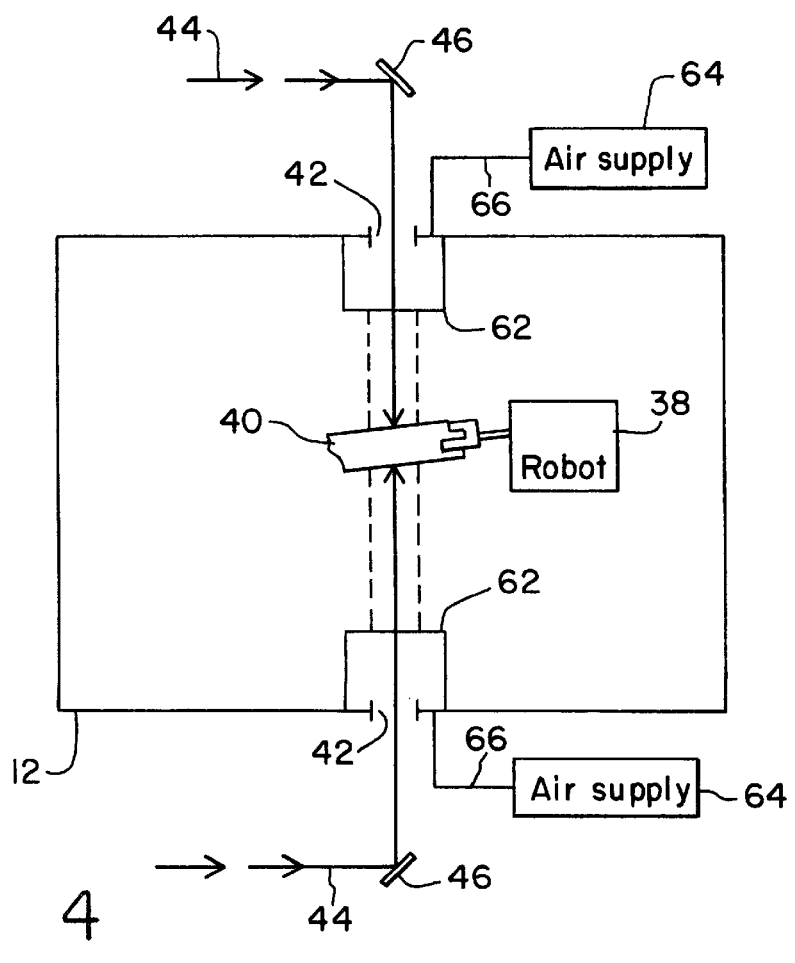
FIG. 4 is a diagrammatic top view of another embodiment of the present invention, utilizing an alternate system to clear the laser beam path within the processing cell.

FIG. 4 discloses another embodiment of the invention in which a mechanism is used to further ensure that the path of laser beam 44, prior to exposure of workpiece 40, is clear of vapor and/or debris. In this embodiment, a device 62 is utilized to maintain a clean and clear beam path for laser beam 44 to workpiece 40. Such beam clearing device 42, as shown in FIG. 4, utilizes an air supply 64 connected to beam clearing device 62 by means of a conduit 66. Device 62 then utilizes the air supplied by air supply 64 to clear the volume of space within enclosure 12 through which beam 44 passes. Additionally, depending upon the geometry necessary from the sides of workpiece 40, additional features of beam clearing device 62 may include light guides, conduits through which beam 44 passes, and other types of fluid ejectors to clear the beam path. In the preferred embodiment, the device would include air injectors located circumferentially around the beam path of laser beam 44 operating under high pressure via air supply 64. Device 64 would eject all debris or particles within the ambient environment of enclosure 12 between port 42 and workpiece 40 away. By such mechanism, beam 44 would impact workpiece 40 without being adversely affected by debris or vapor within the beam path. As shown in FIGS. 1 and 2, more than one beam 44 may be utilized with corresponding additional structure.

In operation, processing cell 10 will continuously inject filtered air or other gasses via gas supply 22 into enclosure 12. At the same time, the vapor exhaust system 14 shall operate to evacuate vapor and other airborne particles from enclosure 12. Furthermore, during operation, liquid removal system 26 will operate as necessary to remove liquid located within the bottom of enclosure 12, filtering such liquid with filter 30 and returning the liquid to transparent overlay applicator 26 (in the closed loop embodiment). In an open looped embodiment, the liquid removal system 26 will filter such used transparent overlay material and other debris through filter 30 and conduct such cleaned liquid to a drain or other liquid processing system. In this open system, then transparent overlay material applicator 26 will be supplied via a pure liquid water source, in embodiments of a laser peening system utilizing water as a transparent overlay. As known in the art, some transparent overlay systems do not utilize water, but other materials as an overlay material.

During operation of the processing cell 10, air knives 48 will be operated via their supply 50 to create a constant current or flow of air moving over ports 42. As processing cell 10 operates, a laser beam 44 will be created and directed by the beam delivery system as representative by mirrors 46 through ports 42 and into contact with workpiece 40.

As is known in the art, such laser peening operation will violently expand the transparent overlay material applied by applicator 36, ejecting such transparent overlay material and other debris, such as the opaque overlay material conventionally used in laser peening, into the atmosphere within enclosure 12. The air knives 48 will prevent such high velocity debris from passing back through ports 42 and coming into contact with mirrors 46 in the outside environment of processing cell 10.

The environment within enclosure 12 after the laser peening operation, will include suspended vapor particles of water, transparent overlay material, and other debris, such as vaporized portions of the opaque overlay material and workpiece. Vapor exhaust 14 works to cleanse the volume within enclosure 12 while the volume is re-supplied with new atmosphere via gas supply 22. Under some processing conditions, it may be preferable for gas supply 22 to inject enclosure 12 with particular gasses, such as nitrogen or argon, depending upon the laser peening treatment needed for workpiece 40.

Additionally, the conduit 24 of gas supply 22 may be located operationally close to beam 44 to ensure that a constant fresh supply of clean and clear gas is created about and adjacent the beam 44. This structure would further minimize contamination of the laser beam 44 with debris and other vapor from previous laser peening operations.

For monitoring of the laser peening operation and processing cell 10, a monitoring device 70 may be included within enclosure 12. To prevent contamination of monitoring device 70 by the byproducts of laser peening operations or from the transparent overlay material which is ejected into enclosure 12, an air knife 72 may be used about monitoring device 70. Air knife 72 may also be connected to an air supply 50. Such air knife 72 would operate in a similar fashion to create a flowing curtain of air over monitoring device 70 to inhibit contact with airborne debris, and flush away any such debris away from monitoring device 70.

In the preferred embodiment of the invention, processing cell 10 utilizes the elements of the cleaning system, i.e., vapor exhaust 14, gas supply 22, and liquid removal system 26, all at the same time. Depending upon operational concerns, it may not be necessary to operate the entire cleaning system during laser peening operations. Further, depending on the concentration of vapor within enclosure 12, it may be possible to dispense with utilization of a separate gas supply 22 thereby simply reducing the pressure within enclosure 12 by means of the vapor exhaust 14, and allowing ambient atmosphere to pass into enclosure 12 via leaks or past door 52 or ports 42.

To maintain the clearest beam path for beam 44 through enclosure 12, use of vapor exhaust 14, gas supply 22, and liquid removal system 26, concurrent operation is recommended.

The invention as previously described, increases the protection level of the associated beam delivery system optics, such as mirrors 46, while safely containing the by-products of the laser peening operation. Additionally, by containing the debris and vapors created by the laser peening operation, reduced environmental concerns result. By creating a processing cell 10 of the previously described nature, the beam delivery system 46 may be more closely located to workpiece 40, thereby increasing the stability and accuracy of the placement of laser beam 44 on workpiece 40.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A processing cell for laser peening, said cell comprising:
    an enclosure that substantially defines the processing cell, said enclosure containing a beam path for laser peening a contained workpiece;
    a transparent overlay material applicator disposed within said enclosure; and
    a cleaning system for clearing said beam path of transparent overlay material and debris prior to a laser peening operation.

2. The processing cell of claim 1 in which said cleaning system comprises an vapor exhaust connected to said enclosure for removing vapor therefrom.

3. The processing cell of claim 2 in which said vapor exhaust includes a filter.

4. The processing cell of claim 1 in which said cleaning system comprises a gas supply connected to said enclosure for injecting gas into said enclosure.

5. The processing cell of claim 1 in which said cleaning system comprises a liquid removal system connected to said enclosure for removing liquid from the processing cell.

6. The processing cell of claim 5 in which said liquid removal system includes a filter.

7. The processing cell of claim 5 in which said liquid removal system is connected to said transparent overlay material applicator and communicates at least some of the liquid removed from the enclosure to said transparent overlay material applicator.

8. The processing cell of claim 1 further comprising a workpiece manipulator disposed within the cell for moving workpieces within said enclosure.

9. The processing cell of claim 1 further comprising a sound suppression system.

10. A processing cell for laser peening, said cell comprising:
    an enclosure that substantially defines the processing cell;
    a transparent overlay material applicator disposed within said enclosure;
    a vapor exhaust connected to said enclosure for removing vapor therefrom;
    a liquid removal system connected to said enclosure for removing liquid from the processing cell; and
    a workpiece manipulator disposed within the cell for moving workpieces within said enclosure.

11. The laser processing cell of claim 10 in which said enclosure includes a port for entry of a laser beam.

12. The laser processing cell of claim 11 further comprising an air knife operationally oriented with said port to inhibit transparent overlay material from passing through or depositing on said port.

13. The laser processing cell of claim 10 in which said liquid removal system is a drain.

14. The processing cell of claim 10 in which said liquid removal system is connected to said transparent overlay material applicator and communicates at least some of the liquid removed from the enclosure to said transparent overlay material applicator.

15. The processing cell of claim 10 in which said gas supply is a fresh air source.

16. A processing cell for laser peening, said cell comprising:

an enclosure that substantially defines the processing cell;

a transparent overlay material applicator disposed within said enclosure; and a monitoring device disposed within said enclosure for monitoring a parameter of a laser peening process.

17. The processing cell of claim 16 further including an air knife operationally connected to said monitoring device.

* * * * *